US008112354B2

(12) United States Patent (10) Patent No.: US 8,112,354 B2
Lalwani et al. (45) Date of Patent: Feb. 7, 2012

(54) METHOD AND SYSTEM FOR VIRTUAL CONSOLIDATION OF BILLER DIRECT WEB SITES

(75) Inventors: Rajesh Lalwani, Saratoga, CA (US); Murali Subbarao, Saratoga, CA (US)

(73) Assignee: Billeo, Inc, Santa Clara, CA (US)

( * ) Notice: Subject to any disclaimer, the term of this patent is extended or adjusted under 35 U.S.C. 154(b) by 1297 days.

(21) Appl. No.: 11/101,733

(22) Filed: Apr. 8, 2005

(65) Prior Publication Data
US 2006/0229985 A1 Oct. 12, 2006

(51) Int. Cl.
*G06Q 40/00* (2006.01)
(52) U.S. Cl. .......................................................... 705/40
(58) Field of Classification Search ................ 705/35–41
See application file for complete search history.

(56) References Cited

U.S. PATENT DOCUMENTS

| 6,324,566 | B1 * | 11/2001 | Himmel et al. ............... 709/203 |
| 6,594,766 | B2 | 7/2003 | Venkat |
| 6,718,365 | B1 * | 4/2004 | Dutta ............................. 709/203 |
| 6,757,674 | B2 * | 6/2004 | Wiens et al. ....................... 707/3 |
| 2001/0001147 | A1 * | 5/2001 | Hutchison et al. ............... 705/26 |
| 2002/0077978 | A1 * | 6/2002 | O'Leary et al. .................. 705/40 |
| 2003/0140004 | A1 | 7/2003 | O'Leary et al. |
| 2003/0191711 | A1 * | 10/2003 | Jamison et al. .................. 705/40 |
| 2003/0233425 | A1 * | 12/2003 | Lyons et al. .................... 709/217 |

* cited by examiner

*Primary Examiner* — Thu-Thao Havan
*Assistant Examiner* — Jennifer Liu
(74) *Attorney, Agent, or Firm* — William L. Botjer

(57) ABSTRACT

The present invention provides a method and a system for consolidating bill payment-related information. A consolidation toolbar is installed inside the browser of a user's computer. The consolidation toolbar enables the user to interact with a virtual consolidation system for facilitating online bill payment-related activities. Lists of all the billers that are of interest to the user are presented through the consolidation toolbar. On selecting a biller, the user is presented with the login page on the biller's web site. The virtual consolidation system assists the user in providing the required information on various web pages on the selected biller's web site, to perform various payment-related activities.

8 Claims, 9 Drawing Sheets

METHOD AND SYSTEM FOR VIRTUAL CONSOLIDATION OF BILLER DIRECT WEB SITES

BACKGROUND

The present invention relates to Graphical User Interfaces (GUIs). More specifically, the present invention relates to online activities related to billing.

In recent years, Electronic Bill Presentment and Payment (EBPP) has become widely acceptable among Internet users. EBPP enables a user to view bills and also pay them over the Internet. The bills can be viewed on the web site of a biller, or the biller may send them to the user via electronic mail or regular mail. The user can make payments either directly on the biller's web site, or indirectly via an intermediate financial institution.

The method of making payments directly on the biller's web site is commonly known as the 'biller direct method'. In this method, a user is required to register on the web site provided by the biller for the purpose of viewing and paying bills. A registered user is required to provide authentication information to the biller's web site in order to view personal bills. The web site can also accept payments against these bills—payments can be made by providing information pertaining to the user's credit card and bank account, and other information relating to the mode of payment. Biller direct web sites have grown over the last two to three years. According to some estimates, more than 4000 biller direct web sites are in operation today in the US alone. However, a very small proportion of these billers' customers make payments through their web sites. Further, it is very difficult to acquire online customers and retain them as regular users.

The other method of making payments is an indirect one, via an intermediate financial institution. This method is a 'consolidated method' for EBPP. In this method, an intermediate entity, usually a financial institution or a portal, creates a site where the user can make payments to one or more billers or personal payees. The user is required to provide authentication information only once to the intermediate entity. For most bills, the user has to know the total amount due before using consolidator web sites to make payments. On the other hand, biller direct web sites have this information readily available for the user. Payments made to billers through consolidator web sites typically need to be processed by a third party, which means a delay of two to five days before these payments are processed. On the other hand, payments made through biller direct web sites can usually be processed or at least acknowledged on the same day. Finally, payments made on consolidator web sites are usually limited to the financial institution's checking account, whereas biller direct web sites offer multiple payment method choices, such as checking the account of any financial institution or credit/debit card.

Another method for enabling EBPP has emerged recently. According to this method, bill presentment is enabled by a system that periodically authenticates itself on the biller's web site. The authentication information is provided by the user to the system. The system 'scrapes' the information relating to the user's bill from the biller's web site. This information is presented to the user in a standardized template. The system allows the user to pay the scraped bill by automatically authenticating the user on the biller's web site. Following this, the user can make payments directly on the biller's web site. However, this method has several operational problems relating to the maintenance of the capability of 'scraping' bill information and extending this capability to additional biller web sites. There may also be errors made in interpreting the consumer's bill information.

Therefore, there is a need for a method and a system for providing the user with the advantages of the biller direct method combined with the consolidated method. In addition, there is also a requirement for a method and system that presents bill information without errors.

SUMMARY

The present invention is directed at a method, a system, and a computer program product for virtual consolidation of biller direct web sites in a toolbar, inside the browser, to enable a user to view and pay bills.

An object of the present invention is to perform virtual consolidation of biller direct web sites comprising the presentation of a list to a user, the list comprising at least one biller; selecting one biller from the list, the selection being performed by the user; and displaying a user authentication page pertaining to the selected biller.

Another object of the present invention is to perform virtual consolidation of biller-direct web sites, comprising: downloading a toolbar for enabling the process of virtual consolidation of biller-direct web sites; confirming user authentication information from a user for using the toolbar; presenting a list to the authenticated user, the list comprising at least one biller; selecting one biller, the selection being performed by the user; and displaying a user authentication page of the selected biller.

Yet another object of the present invention is to perform virtual consolidation of biller-direct web sites, comprising: presenting a list to a user, the list comprising: at least one biller; selecting one biller, the selection being performed by the user; displaying a user authentication page of the selected biller; providing authentication information on the user authentication page; and performing at least one bill payment related activity.

Yet another object of the present invention is to perform virtual consolidation of biller-direct web sites, comprising: presenting a list to a user, the list comprising: at least one biller; selecting one biller from the list, the selection being performed by the user; displaying a user authentication page of the selected biller; providing user authentication information on the page; and displaying a menu, the content of the menu being links to the pages of the selected biller.

Still another object of the invention is to perform virtual bill consolidation, comprising: presenting a list to a user, the list comprising: at least one biller; selecting one biller from the list, the selection being performed by the user; displaying a user authentication page of the selected biller; providing the user authentication information on the user authentication page; performing at least one bill payment related activity; and saving the page related to the bill payment activity.

Still another object of the present invention is to provide a system for virtual consolidation of biller-direct web sites, comprising: a computer running a process for consolidating and presenting a list of billers inside the browser of a user; a database containing information relating to the list of billers; and a server providing an interface between the computer and the database, the server enabling virtual consolidation of biller-direct web sites to the user.

A system, in accordance with the present invention, comprises a web services client, a web services server, and a central repository. The web services server and the central repository together form a virtual consolidation system, which communicates with the web services client over the Internet, to provide virtual bill consolidation services. The services are provided through a consolidation toolbar, which is represented inside the browser of the web services client. The consolidation toolbar presents the user with a list of billers, derived from the central repository. On selecting the required biller, the user is directly presented with the authentication page on the selected biller's web site—the consolidation toolbar fills in the authentication information on behalf of the user. This information can be provided by a password vault and electronic wallet. The password vault and electronic wallet also aid the consolidation toolbar in remembering and filling up payment information on the biller's web sites. In addition, the consolidation toolbar makes available shortcuts to access the most commonly used pages provided by the biller web site. The consolidation toolbar allows the user to save a bill or payment confirmation page in the central repository for future reference. The user can also choose to create automated reminders for future payments.

BRIEF DESCRIPTION OF THE DRAWINGS

The preferred embodiments of the invention will hereinafter be described in conjunction with the appended drawings, provided to illustrate and not to limit the invention, wherein like designations denote like elements, and in which.

DESCRIPTION OF PREFERRED EMBODIMENTS

The present invention provides a toolbar to enable a user to perform bill payment-related activities over the Internet. The user can download and install the toolbar in the browser of a computer. The toolbar enables communication over a network with a virtual consolidation system, to provide the user with the required information for performing bill payment-related activities.

Figure 1:
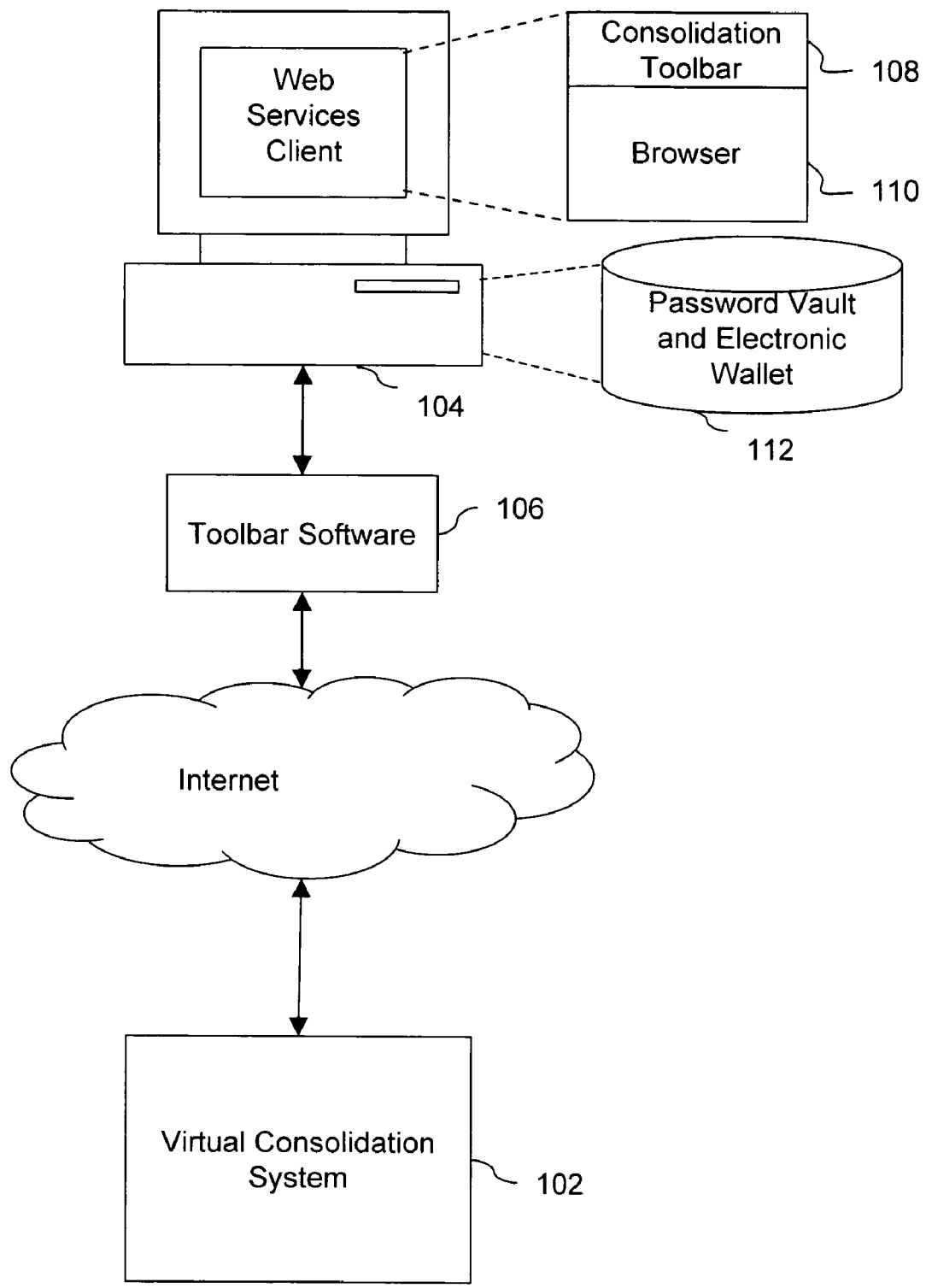
FIG. 1 illustrates an exemplary environment for implementing a system, in accordance with an embodiment of the present invention.

FIG. 1 illustrates an exemplary environment for implementing a system, in accordance with an embodiment of the present invention. A virtual consolidation system 102 communicates with a web services client 104 over a network. According to a preferred embodiment of the present invention, the network is the Internet. Web services client 104 is a client that uses the services provided by virtual consolidation system 102. Web services client 104 can be any computing device such as a desktop, a laptop, a personal digital assistant, or any other fixed or mobile computing device. A user at web services client 104 downloads and installs a toolbar software 106.

Toolbar software 106 facilitates communication between virtual consolidation system 102 and web services client 104. Toolbar software 106 is an intelligent software process, which is created by using C++ as the programming language. It is initiated each time a browser 110 is launched by the user. However, it should not be considered that the use of programming language is limited to C++. Other programming languages such as Visual Basic, C#, Java or any other language may be used.

Toolbar software 106 provides user information at web services client 104 to virtual consolidation system 102. Toolbar software 106 also extracts information requested by the user from virtual consolidation system 102. The extracted information is displayed to the user with the help of a consolidation toolbar 108. Consolidation toolbar 108 is a Graphical User Interface (GUI) that enables the user to interact with virtual consolidation system 102 and biller direct web sites. The interaction is enabled by the presentation of various options supported by toolbar software 106 by means of graphical images to the user. In an embodiment, according to the invention, consolidation toolbar 108 is displayed after the user provides appropriate authentication information to toolbar software 106. A password vault and electronic wallet 112 is provided for storing authentication information to access various biller direct web sites, and also the bank and credit/debit card accounts of the user. Password vault and electronic wallet 112 is a set of encrypted files that contains authentication and payment-related information for a user. This information is provided to password vault and electronic wallet 112 by toolbar software 106. Password vault and electronic wallet 112 can be stored on a hard drive or a removable drive. Password vault and electronic wallet 112 is also stored at web services client 104. In an alternate embodiment, password vault and electronic wallet 112 is stored at virtual consolidation system 102. Consolidation toolbar 108 is displayed inside browser 110, used by web services client 104. Microsoft Internet Explorer is an exemplary browser 110. However, the invention should not be considered limited only to Microsoft Internet Explorer. Other browsers such as Netscape Navigator, Mozilla, FireFox, Safari or any other browser can also be used.

Figure 2:
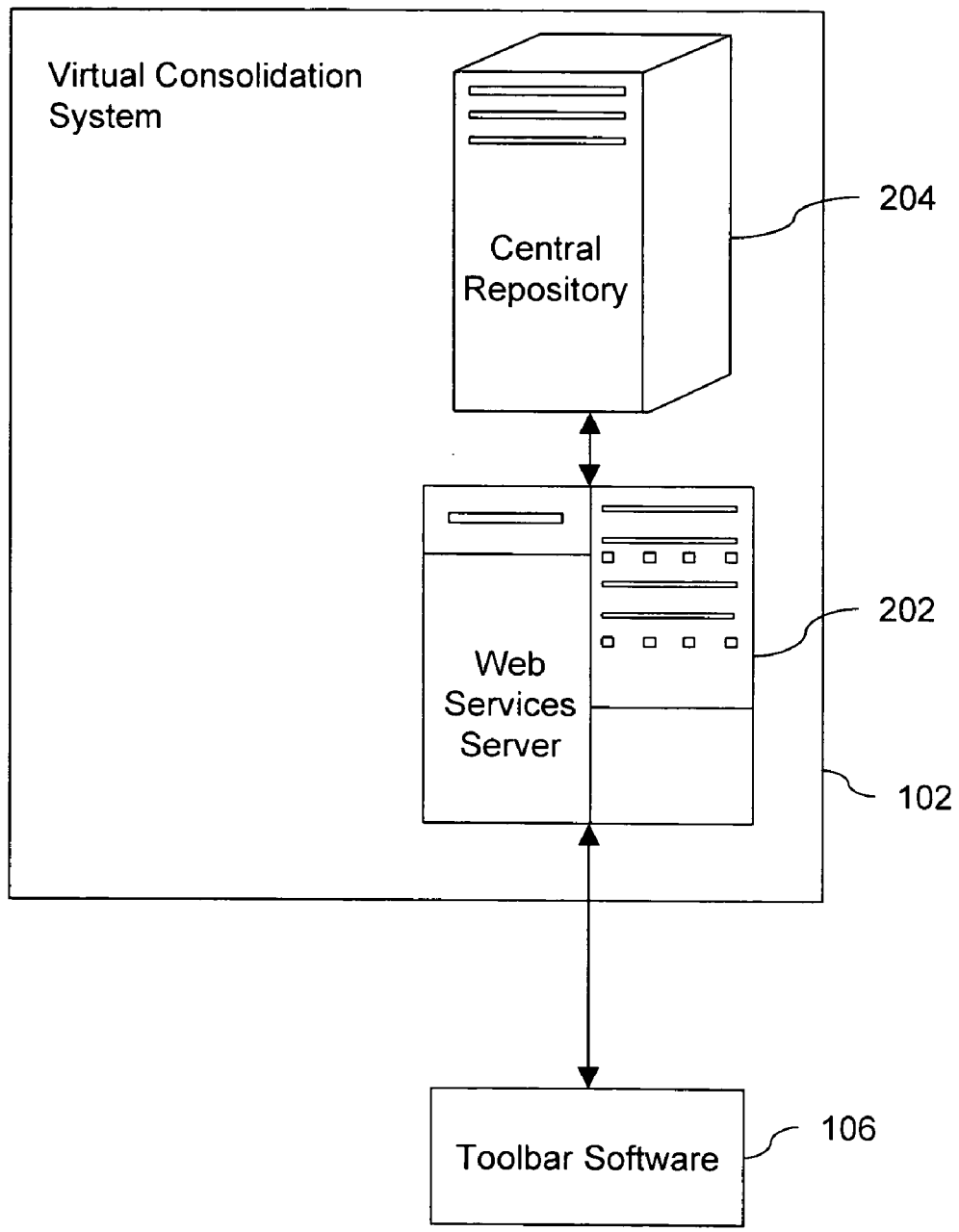
FIG. 2 illustrates a virtual consolidation system, in accordance with an embodiment of the present invention.

FIG. 2 illustrates virtual consolidation system 102, in accordance with an embodiment of the present invention. Virtual consolidation system 102 comprises a web services server 202 and a central repository 204. Web services server 202 enables communication between toolbar software 106 and virtual consolidation system 102. Central repository 204 stores and organizes information relating to multiple web services clients and various web sites. More specifically, central repository 204 contains information relating to a variety of billers and their web sites. In addition, central repository 204 contains information pertaining to the profile of the user at web services client 104. In an embodiment, the profile of the user comprises authentication information for authenticating the user, a list of billers of which the user is a customer, information relating to payment methods employed by the user, etc. The above-mentioned system elements are explained in detail hereafter.

Web Services Server 202

Figure 4:
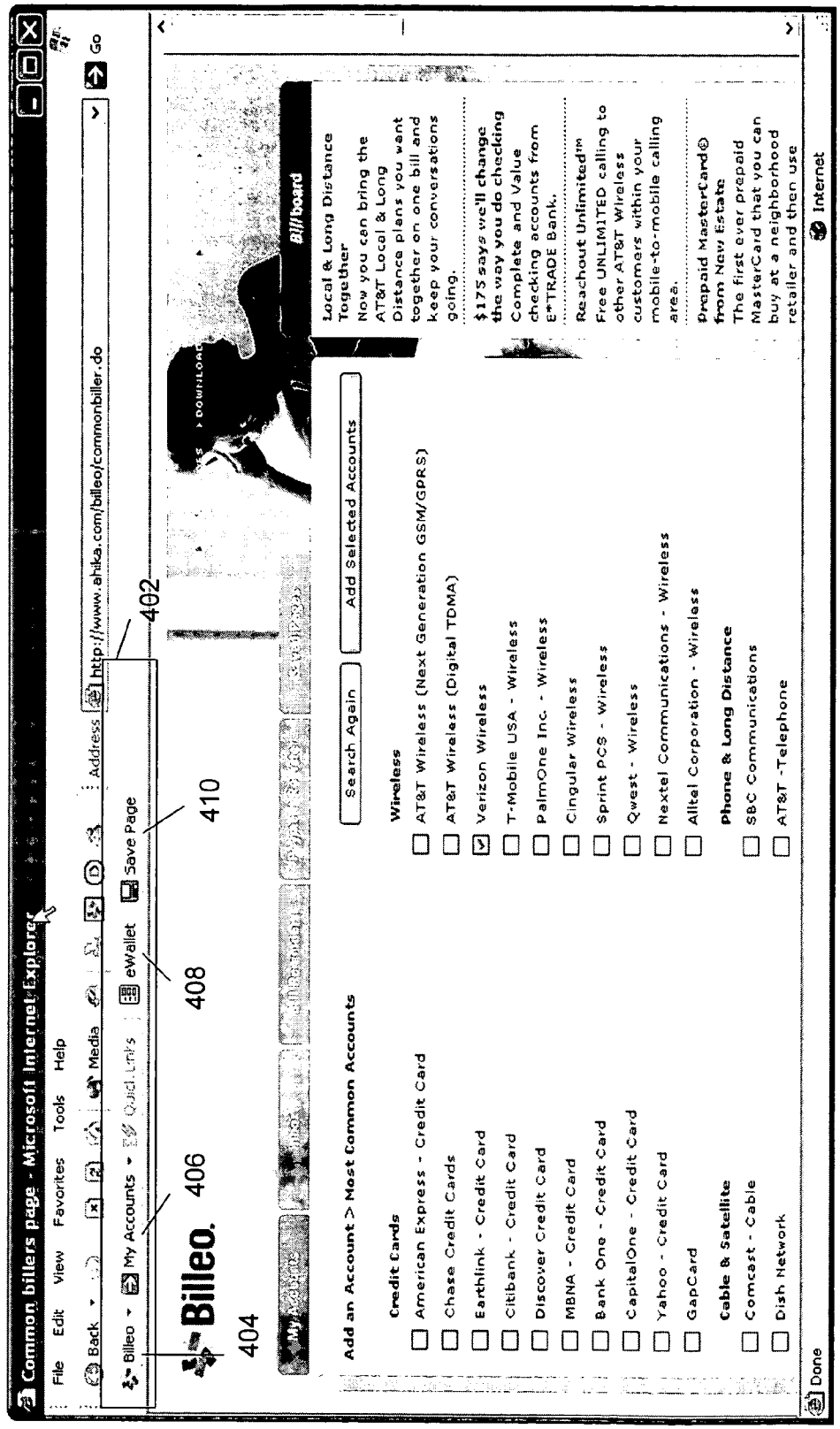
FIG. 4 is a screenshot illustrating an exemplary consolidation toolbar, in accordance with an embodiment of the present invention.

Web services server 202 provides an interface for communication between toolbar software 106 and central repository 204. More specifically, web services server 202 provides a web-based interface, which enables the user to communicate with virtual consolidation system 102. The user may communicate with virtual consolidation system 102 to view, add, modify or delete information pertaining to the user's profile or the web pages stored by the user in central repository 204. In an exemplary embodiment, each time the user provides authentication information to toolbar software 106, web services server 202 verifies the authentication information. This verification is performed by comparing the profile of the user in central repository 204 with the authentication information provided by the user. The user is considered to be authenticated if the information matches. Web services server 202 activates consolidation toolbar 108, so that the authenticated user can use it. FIG. 4 illustrates a web page, which displays an exemplary consolidated toolbar 402. This figure is subsequently explained in detail. The contents of consolidation toolbar 108 are generated on the basis of the profile of the user. In an exemplary embodiment, the user profile may specify the billers of interest to the user. In another embodiment, the user profile may specify the location of the user. On the basis of this, web services server 202 may display the billers of interest to the user as billers providing services in the same location. The user can then easily select the required billers of interest from this shorter list. Billers of interest are displayed through consolidation toolbar 108.

Programs residing in web services server 202 provide web services client 104 with the services of the present invention. According to an embodiment, the services provided include a display of a list of billers of interest to the user through a graphical image in consolidation toolbar 108. The list comprises links to the web sites of these billers. When a user selects a biller from the list, toolbar software 106 directs the user to a specific web page in the web site of the selected biller. Web services server 202 can specify the web page. In a preferred embodiment, the web page is a login page on the biller's web site—the login page is the page where the user provides authentication information to access user-specific pages on the biller's web site. User-specific pages may comprise a web page that displays a bill, a web page for making payments, web pages for viewing payment history, etc.

Central Repository 204

Central repository 204 is a database where information is stored. The information can include the profile of the user. According to an embodiment, the user profile comprises information for authenticating the user, to access virtual consolidation system 102 through toolbar software 106. The authentication information can be in the form of a user name and a password, which are provided by the user at the time toolbar software 106 is installed. In another embodiment, the profile of the user includes information relating to payment methods that can be used by the user to perform online payments. For example, the user can have one or more credit card accounts or bank accounts. Central repository 204 stores most of the information pertaining to authentication of the virtual consolidation system and payment accounts. All of the authentication information for biller direct web sites and payment information is stored in password vault and electronic wallet 112. According to an embodiment, web services server 102 may communicate with toolbar software 106 to share information between password vault and electronic wallet 112 and central repository 204. In an embodiment, the user provides the account information at the time toolbar software 106 is installed. This information may comprise account details such as an account number, expiry date, and other related details. In another embodiment, the user provides account information or modifies previous information at any time after authentication, to access virtual consolidation system 102. The information provided by the user is communicated by toolbar software 106 to central repository 204 through web services server 202. In addition to account information, central repository 204 stores other information available on a web page. For example, a bill viewed on a biller's web site is saved in a central repository when indicated by the user. In another embodiment, a confirmation received by the user is saved, after a payment has been made on the biller's web site. In addition to payment information, the user profile also specifies the billers of interest—the customer's billers. The user interacts with the billers of interest over the Internet.

In addition to the user profile, central repository 204 also stores information relating to various billers and their web sites. According to an embodiment of the invention, central repository 204 maintains a list of web sites. More particularly, central repository 204 maintains a list of biller web sites. The list comprises the links contained within the web sites. For instance, a link to the login page within a biller's web site is contained in the list. The login page is the web page, where the user who is a customer of the biller is requested to provide authentication information. Authentication information is required on a biller web site so as to allow or deny the user access to a biller account. The biller account can comprise billing information such as bill payments that are due, account activity, or any other personal information pertaining to the user. Biller information may also comprise links to various other web pages within the web site. In an embodiment, the links to the web pages providing functions that are common across all biller web sites are provided. These links are presented in consolidation toolbar 108 in a manner that is similar to the one in application number with filing Ser. No. 10/769,003, filed by Ahika Corporation, now known as Billeo Inc., on Jan. 30, 2004, and incorporated herein by reference.

The data stored in central repository 204 is updated, modified or deleted by the user through web services server 202. In another embodiment, the data in the central repository is updated, modified or deleted personally by editors at virtual consolidation system 102. The data may also be updated, modified or deleted by billers listed in central repository 204. The data provided by a biller includes additional links to web pages within the biller's web site. These links are in addition to the links for common functions provided in consolidation toolbar 108. Graphical images of the additional links are displayed only if the user downloads a web page of the biller. In an exemplary embodiment, the additional links direct the user to various products or services that are exclusively provided by the biller.

Figure 3:
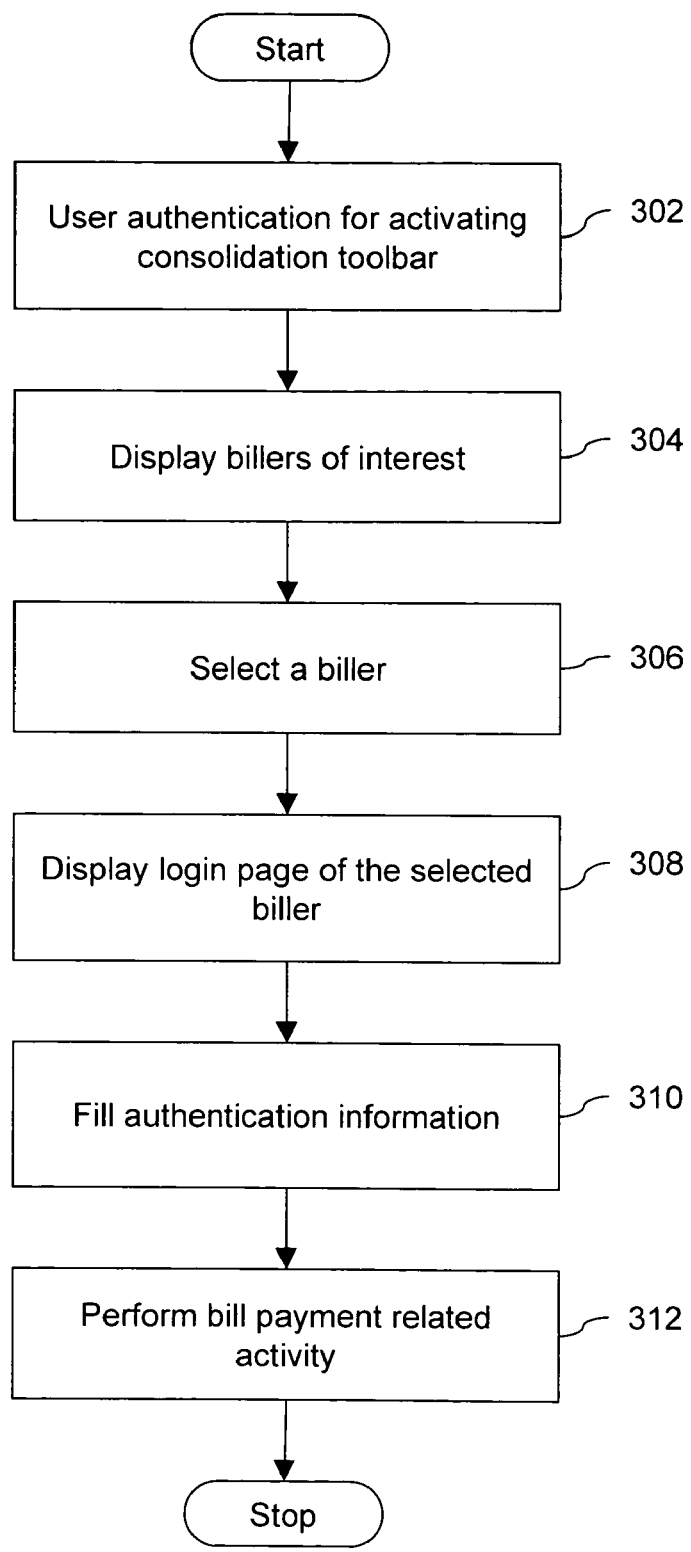
FIG. 3 is a flow chart illustrating the flow of processes involved in providing virtual consolidation of biller web sites, in accordance with an embodiment of the present invention.

FIG. 3 illustrates the flow of processes involved in providing virtual consolidation of biller web sites, in accordance with an embodiment of the present invention. At step 302, the user at web services client 104 performs authentication to activate consolidation toolbar 108. As mentioned earlier, consolidation toolbar 108 is a GUI that provides the user with graphical images to facilitate the selection of available options. As known to a person skilled in the art, these graphical images can be in the form of buttons, images, menu structures, and sub-menu structures. FIG. 4 illustrates an exemplary consolidation toolbar 402, which is activated after successful user authentication. Exemplary consolidation toolbar 402 retrieves user-specific information such as a list of billers and their login pages from web services server 202. Therefore, most of the buttons in exemplary consolidation toolbar 402 are active. On selecting a button 404, the user is directed to a web page. From there the user can operate the user profile in central repository 204 by updating, modifying or deleting information relating to authentication to access virtual consolidation system 102, to access the biller's web site; and details pertaining to the payment methods employed by the user and billers of interest to the user. On selecting a button 406, the user can view a menu, comprising billers of interest for the user. On selecting a button 408, the user can view the various payment methods and their details, which are used by the user to perform online payments. Button 410 allows the user to save a page, such as the page displaying the bill or a payment confirmation. On selecting this option, toolbar software 106 communicates with web services server 202, to store the indicated information in central repository 204.

Figure 5:
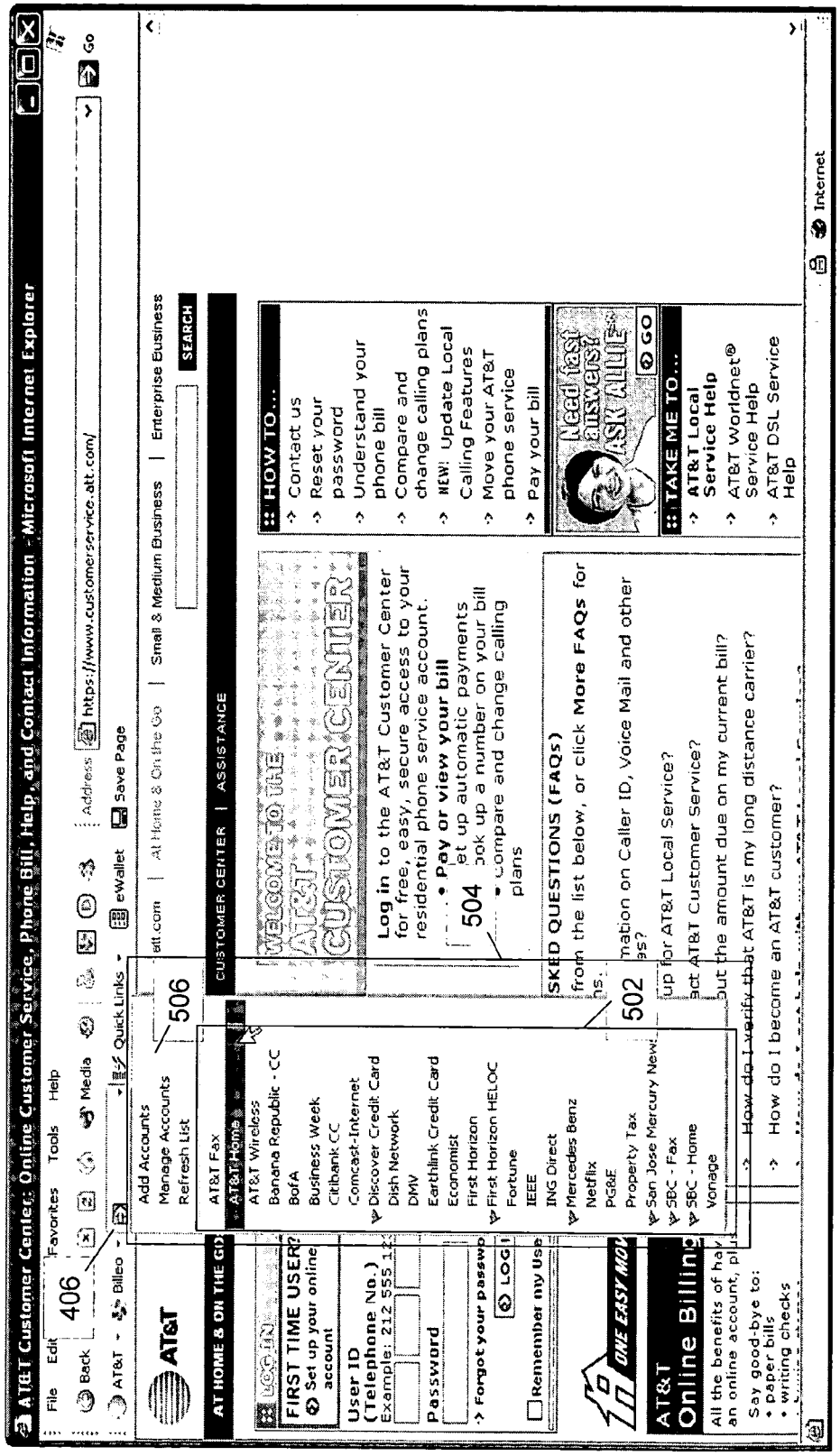
FIG. 5 is a screenshot illustrating a list of billers, in accordance with an embodiment of the present invention.

At step 304, based on the profile of the user, consolidation toolbar 108 displays a list of the billers of interest to the user. This list is extracted by toolbar software 106 from central repository 204. FIG. 5 shows a screenshot that displays an exemplary list 502 comprising billers of interest. Exemplary list 502 is displayed as a part of a drop-down menu 504 through button 406. Drop-down menu 504 also comprises options 506 that allow the user to manage list 502.

At step 306, the user selects a biller from the list. Toolbar software 106 had retrieved the information pertaining to the biller at step 302. This information is displayed to the user. In an embodiment, the information includes the link to the login page in the selected biller's web site. FIG. 5 illustrates that on selecting 'AT&T Home' from list 502, the user is presented with the login page of AT&T's web site.

Figure 6:
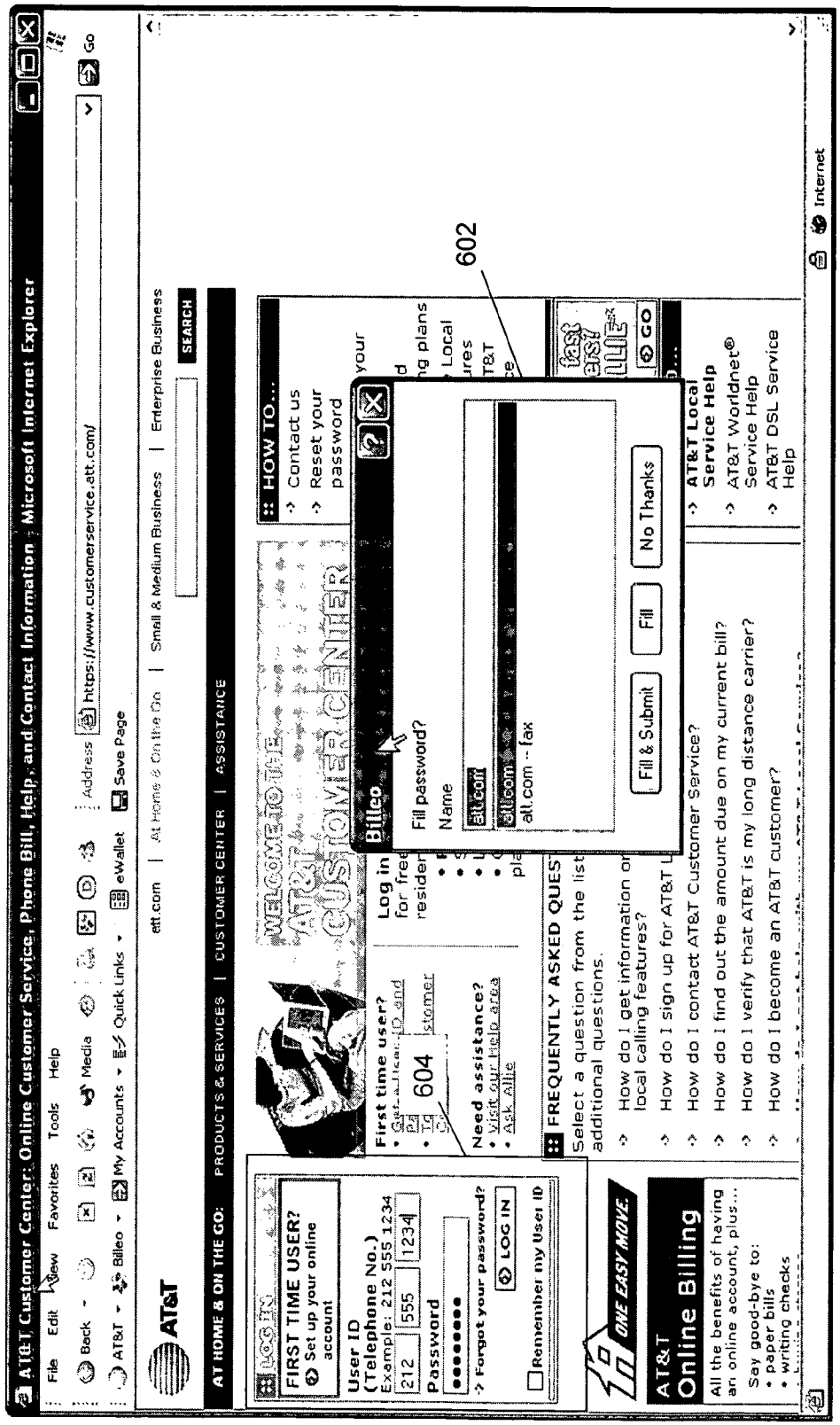
FIG. 6 is a screenshot illustrating the automatic filling of user authentication information on a biller web site, in accordance with an embodiment of the present invention.

At step 308, the login page of the selected biller is displayed in browser 110. At step 310, the authentication information is provided in the required fields on the login page. In an embodiment, the authentication information is automatically provided by password vault and electronic wallet 112. According to one embodiment, toolbar software 106 prompts the user to automatically fill in the authentication information. FIG. 6 shows a screenshot displaying a prompt box 602, to prompt the user to automatically fill in the authentication information. If the user chooses to do so, a login field 604 is filled with the information provided by password vault and electronic wallet 112. In another embodiment, password vault and electronic wallet 112 does not contain authentication information by means of which the user can access the biller's web site. In this case, the user is required to fill in the authentication information on the login page. Toolbar software 106 stores this information in password vault and electronic wallet 112 that corresponds to the selected biller. Therefore, authentication information can be extracted from password vault and electronic wallet 112 when the user goes to the login page of the selected biller in future. The extracted information is provided to toolbar software 106, which automatically fills in the required fields on the login page.

Once authenticated, the user is allowed access to the web pages within the biller's web site, which contains billing information for the user. At step 312, the user performs a bill payment-related activity. One of the bill payment-related activities is viewing a bill. The user can make a request to view the bill for which either a payment has been made in the past, or for which the payment is due. Another bill payment-related activity is to pay a bill. The user can pay a bill on the biller's web site by providing payment information, which can be in the form of a user's credit card account or bank account, or any other method by which the user can make online payments. A person skilled in the art is already familiar with the method of performing online payments through credit cards, bank accounts or any other similar method.

According to an embodiment of the invention, information pertaining to all the methods of payment that can be employed by the user are stored in the profile of the user. This information is stored in password vault and electronic wallet 112 and comprises details of the method of payment, for instance, the user's name on a credit card, the validity period of the credit card, the credit card number, the security code (if required), or any other information that is specific to the user's credit card. This information can be provided by the user to toolbar software 106 at any time. Toolbar software 106 stores this information in password vault and electronic wallet 112. At the time of the payment of a bill, the user can choose from the various methods of payment available in password vault and electronic wallet 112. In an embodiment, a graphical image is displayed in consolidation toolbar 108 to represent the electronic wallet. When the user selects the mentioned graphical image various methods of making payments are displayed. The user can choose a suitable method of payment and drag and drop the information, such as the credit card number on a corresponding form field of the web page. Thereby, the user is saved from the need to remember all the details pertaining to all the possible payment methods used for performing online payments. If the user attempts to pay a bill on the same biller web site in the future, toolbar software 106 remembers the relationship between payment method information and fields on the form of the web page and can automatically fill in the information.

Figure 7:
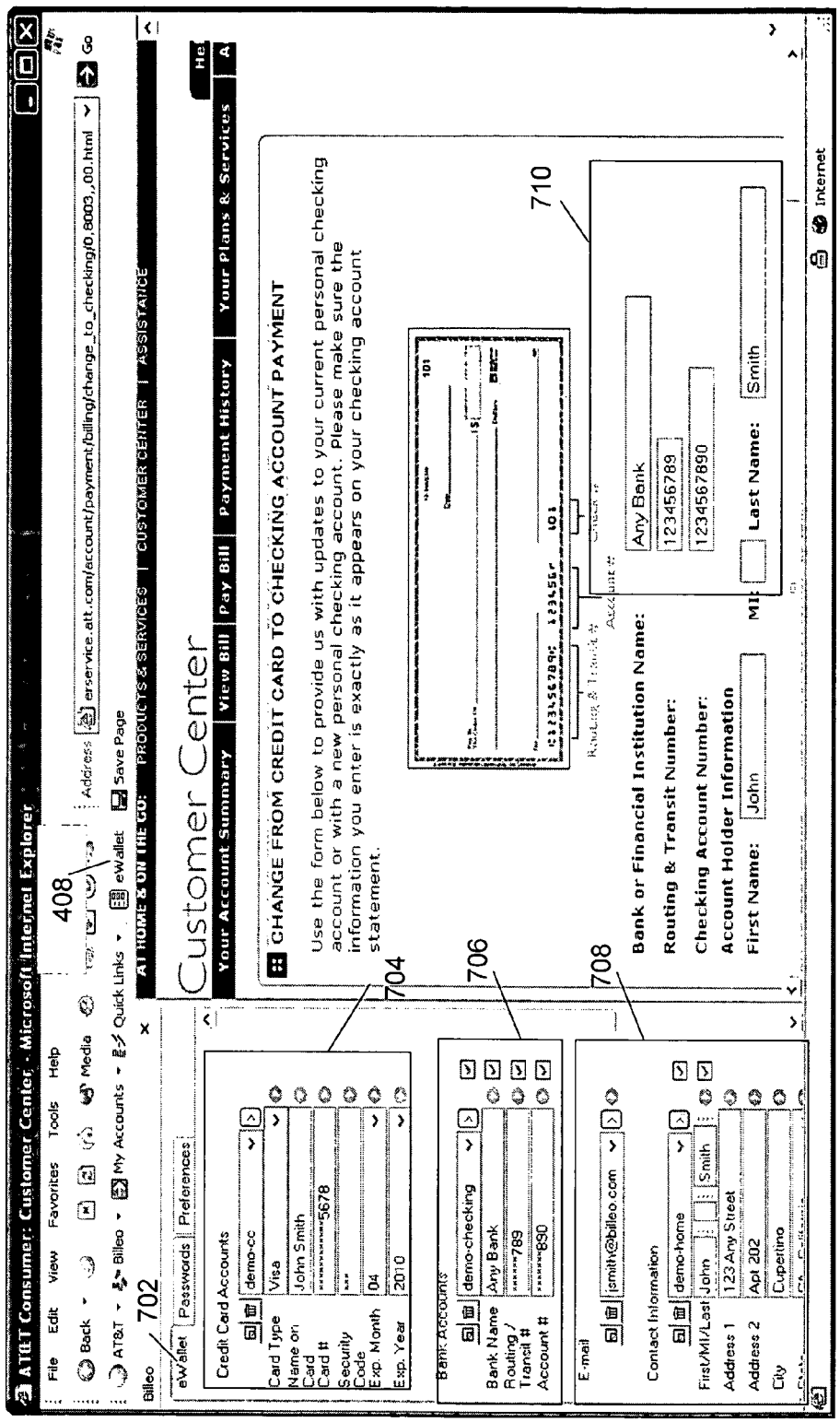
FIG. 7 is a screenshot illustrating the electronic wallet functionality, in accordance with an embodiment of the present invention.

FIG. 7 illustrates a screenshot that displays the functions of button 408. On selecting button 408, the user is presented with an e-wallet 702, which displays various payment methods that can be employed by the user to make online payments. Some of the payment methods displayed are credit card accounts 704 and bank accounts 706. E-wallet 702 also displays the user's personal information 708, which comprises the user's e-mail and the contact information provided by the user. According to FIG. 7, the user employs the payment method to pay the biller, using a bank account. Thereby, details relating to this method of payment are automatically filled in the corresponding fields 710 on the biller's web page, for performing the payment.

Figure 8:
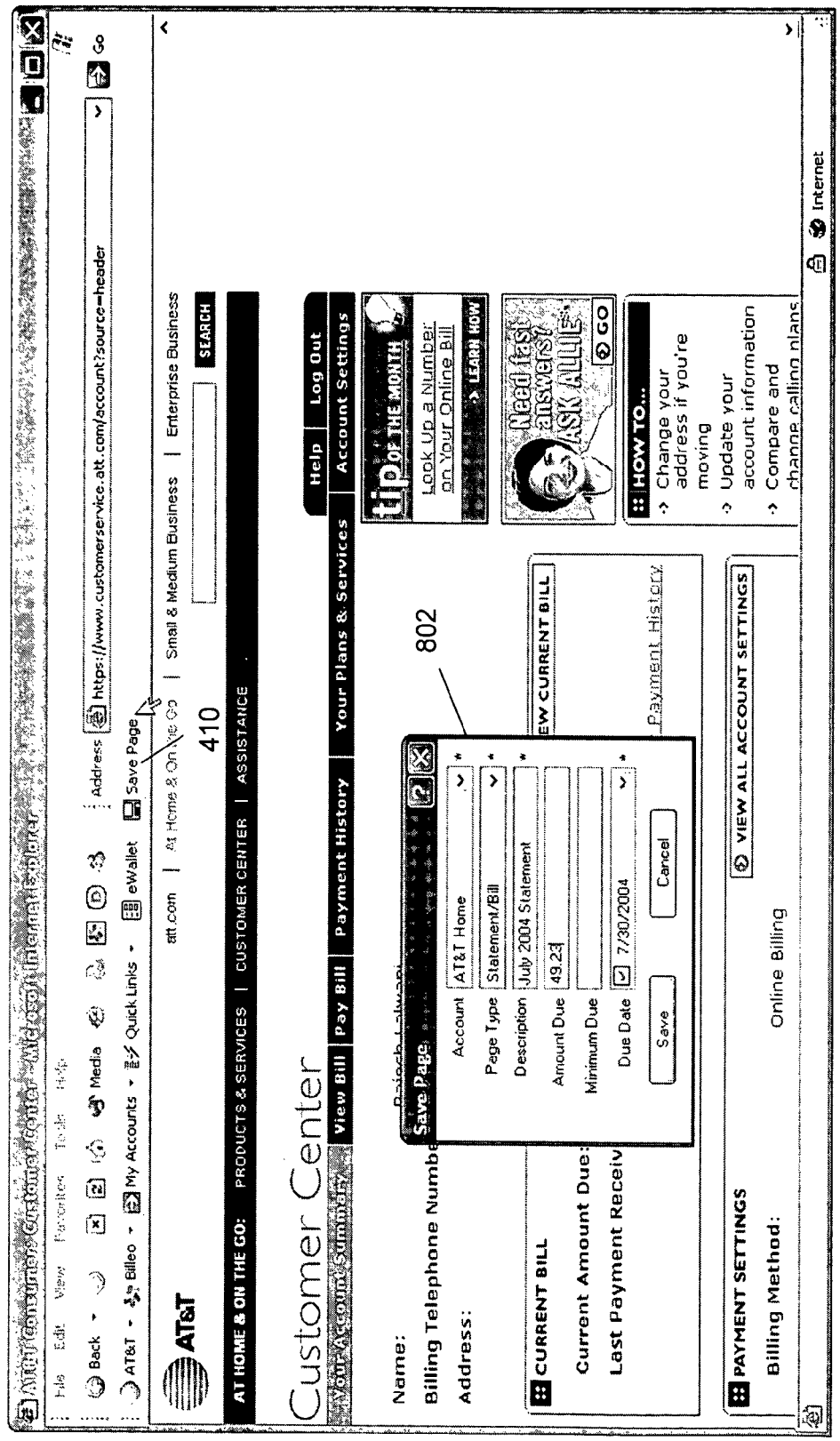
FIG. 8 is a screenshot illustrating the function of saving bills or payment confirmations, in accordance with an embodiment of the present invention.

Another payment-related activity is to save a bill or a confirmation provided by the biller after making a payment. The user can save the bill or payment confirmation by selecting a suitable option from consolidation toolbar 108. Button 410 provides this option in FIG. 4. On selecting button 410, the bill or payment confirmation is saved in central repository 204 along with the profile of the user. The user can view the saved information at any time in the future by sending a request through toolbar software 106. FIG. 8 shows a screenshot displaying an exemplary dialog box 802, which prompts the user to provide information relating to the web page that is being saved. Dialog box 802 allows the user to provide information relating to the selected biller, the type of web page (whether it is a bill or payment confirmation), a description of the web page, or any other relevant information. This information is provided to web services server 202, and is stored with the web page in central repository 204. This enables the user to access the saved web page in future.

One more payment-related activity is to create an automated reminder for future bills and payments. The user can save such reminders with the user profile on central repository 204. Web services server 202 sends these reminders to the user when they are required.

In a preferred embodiment, virtual consolidation system 102 provides a menu, which is provided within consolidation toolbar 108, to the user. The menu comprises a list of actions that are commonly performed on all biller web sites or other similar web sites. For instance, actions like viewing a bill and paying a bill, which lead to the web page that displays the bill and the web page where the user provides payment information for paying the bill, are common across all biller web sites.

Figure 9:
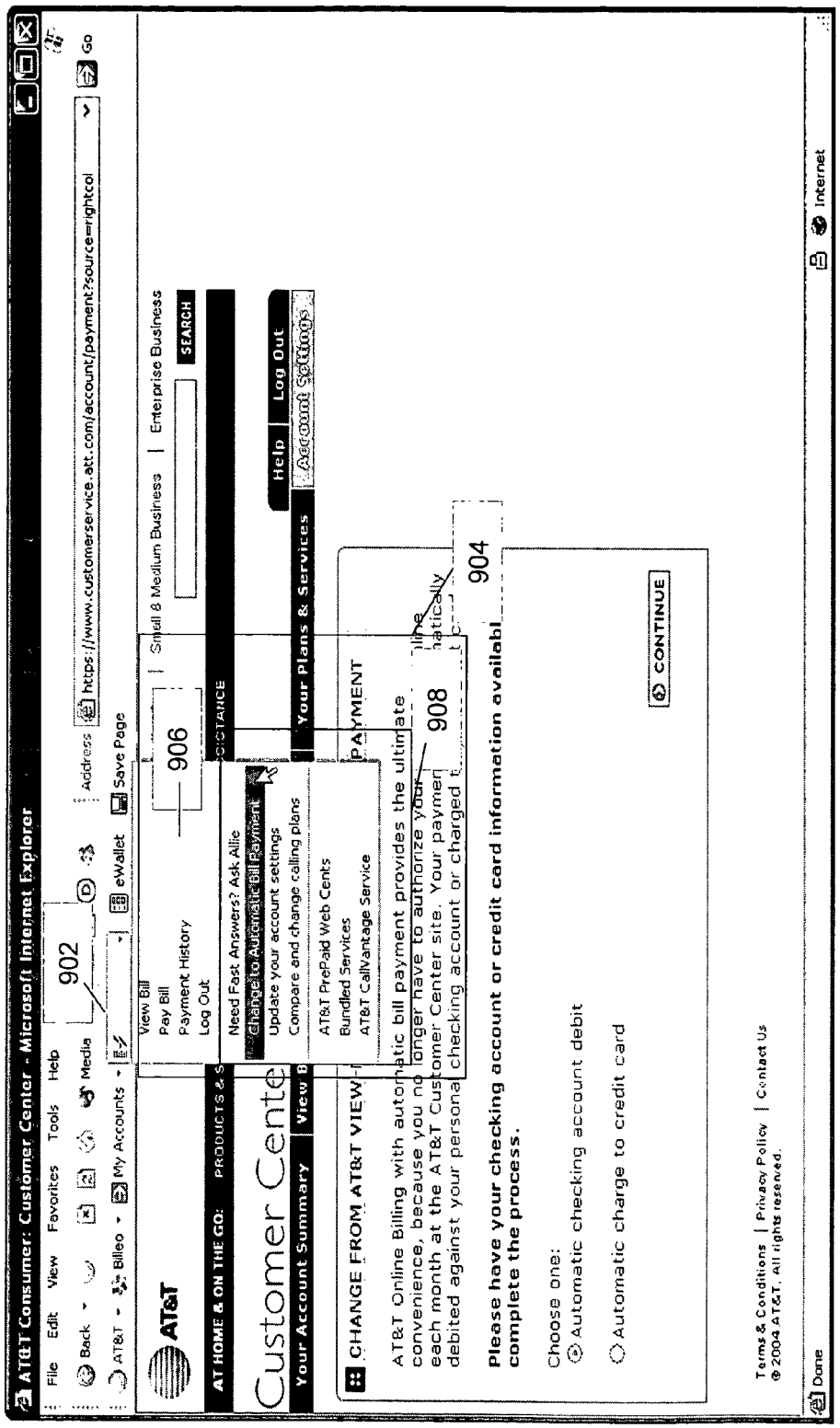
FIG. 9 is a screenshot illustrating the function of accessing common actions, in accordance with an embodiment of the present invention.

These actions are displayed by means of a menu in consolidation toolbar 108. FIG. 9 illustrates exemplary consolidated toolbar 402, which has a button 902 to provide a list of common actions. The user is presented with a drop-down menu 904 on selecting button 902. Menu 904 comprises a list of common actions 906. In addition, menu 904 comprises a list of unique actions 908. List of unique actions 908 provides links to web pages specified by the selected biller. The process of forming the menu is explained in application number with filing Ser. No. 10/769,003, filed by Ahika Corporation, now known as Billeo, on Jan. 30, 2004, and incorporated herein by reference.

Consolidation toolbar 108 enables the user to access all the consolidated information maintained by virtual consolidation system 102. In addition, virtual consolidation system 102 provides benefits to the user, since the user is saved from the need to remember various authentication details and particulars relating to payment methods. Web services server 202 and central repository 204 maintain all the information necessary for performing payment-related activities over the Internet. Thereby, complicated and large amounts of information are made accessible by the click of a button.

A person skilled in the art can appreciate that all the connections between various elements of the system of the present invention may be wired or wireless, depending on the requirements of the system. Also, it should be noted that it is not necessary that the various processing machines and/or storage elements are physically located in the same geographical location. The processing machines and/or storage elements may be located in geographically distinct locations and connected to each other, to enable communication. This facilitates convenient and speedy navigation of web sites.

While the preferred embodiments of the invention have been illustrated and described, it will be clear that it is not limited to these embodiments only. Numerous modifications, changes, variations, substitutions and equivalents will be apparent to those skilled in the art, without departing from the spirit and scope of the invention, as described in the claims.

What is claimed is:

1. A method for conducting at least one bill payment related activity by using a consolidation toolbar inside a browser, wherein the browser is installed on a web services client, the web services client being part of a network, wherein the network further comprises a web services server, and a central repository, the method comprising the steps of:
   a. initiating a toolbar software associated with the consolidation toolbar each time the browser is launched by a user, the toolbar software enabling communication with the central repository and the web services server;
   b. verifying authentication information provided by the user to the toolbar software for using the consolidation toolbar, the authentication information being associated with the consolidation toolbar, wherein verifying the authentication information is performed by the web services server by communicating with the central repository, and wherein the central repository is a database over the network, the database comprising profile information of one or more users and information related to one or more billers;
   c. displaying the consolidation toolbar comprising a list of the billers of interest to the user, the consolidation toolbar being displayed after the user provides appropriate authentication information to the toolbar software, wherein the consolidation toolbar is a Graphical User Interface (GUI) enabling a user interaction by presenting one or more options by means of graphical images in the consolidation toolbar, the interaction being supported by the toolbar software;
   d. consolidating a list of billers in the consolidation toolbar based on the authentication information provided by the user, the consolidating comprising:
      determining a specific authentication information corresponding to each of the one or more billers based on the profile information of the user and the information related to the one or more billers, the specific authentication information being stored in a password vault and electronic wallet present at the web services client;
      providing at least one uniform link in the consolidation toolbar for at least one common activity corresponding to the one or more billers, wherein providing the at least one uniform link comprises associating Uniform Resource Locators (URLs) of the one or more biller corresponding to the at least one common activity with the at least one uniform link and updating the at least one uniform link each time the browser is launched; and
      providing an automated reminder in the consolidation toolbar for the at least one bill payment related activity for at least one of the one or more billers;
   the list of billers being derived from one or more billers stored in the central repository present in the network, the one or more stored billers being maintained by an editor, the list of billers being associated with the authenticated user, wherein the list of billers is personalized by the authenticated user, wherein each of the one or more billers is a service provider seeking a payment for one or more services provided to the authenticated user;
   e. presenting the consolidated list of billers, the at least one uniform link, and the automated reminder to the authenticated user, wherein each biller of the consolidated list of the billers, the at least one uniform link, and the automated reminder are displayed as corresponding graphical images in the consolidation toolbar;
   f. performing an action on the consolidation toolbar, the action being at least one of a selection of at least one biller from the list of consolidated billers, accessing the at least one uniform link, and accessing the automated reminder, the action being performed by the authenticated user;
   g. displaying to the authenticated user the displaying comprising:
      displaying a user authentication page of the at least one selected biller when the action comprises selection of at least one biller from the list of consolidated billers, wherein the corresponding user authentication page is displayed directly in response to the selection of the at least one biller;
      displaying a page corresponding to the at least one uniform link when the action comprises accessing the at least one uniform link; and
      displaying the details of the automated reminder to the user when the action comprises accessing the reminder;
   h. providing authentication information for authenticating the user at the authentication page when the authentication page is displayed, the authentication being based on the specific authentication information corresponding to the at least one selected biller, wherein the specific authentication information is transferred from the password vault and electronic wallet to the authentication page without any intervention of the user;
   i. performing the at least one bill payment related activity on a website of the at least one selected biller, and
   j. saving one or more details associated with the at least one bill payment related activity at the central repository, wherein the steps of the method are performed by a microprocessor included in a computer.

2. The method according to claim 1, wherein the step of presenting the list of consolidated billers associated to the authenticated user comprises presenting the name corresponding to each biller present in the consolidated list of billers.

3. The method according to claim 1, wherein the step of presenting the list of consolidated billers associated to the authenticated user comprises presenting a dropdown list using the consolidation toolbar.

4. The method according to claim 1, wherein the step of displaying the user authentication page of the at least one selected biller comprises displaying the page on the web site of the at least one selected biller that requests for authentication information, the authentication information being associated with the at least one selected biller.

5. A computer program product for use with a computer, the computer program product comprising a set of instructions stored in a non-transitory computer usable medium having a computer readable program code embodied therein for conducting at least one bill payment related activity by using a consolidation toolbar inside a browser, wherein the browser is installed at a web services client, the computer program product comprising instructions which when executed by a computer processor causing the computer processor to perform the steps of:
  a. initiating a toolbar software associated with the consolidation toolbar each time the browser is launched by a user, the toolbar software enabling communication among the web services client, a central repository and a web services server in a network;
  b. verifying authentication information provided by the user for using the consolidation toolbar, the authentication information being associated with the consolidation toolbar, wherein verifying the authentication information is performed by the web services server by communicating with the central repository, and wherein the central repository is a database over the network, the database comprising profile information of one or more users and information related to one or more billers;
  c. displaying the consolidation toolbar comprising a list of the billers of interest to the user, the consolidation toolbar being displayed after the user provides appropriate authentication information to the toolbar software, wherein the consolidation toolbar is a Graphical User Interface (GUI) enabling a user interaction by one or more options by means of graphical images in the consolidation toolbar, the interaction being supported by the toolbar software;
  d. consolidating a list of billers in the consolidation toolbar based on the authentication information provided by the user, the consolidating comprising:
    determining a specific authentication information corresponding to each of the one or more billers based on the profile information of the user and the information related to the one or more billers, the specific authentication information being stored in a password vault and electronic wallet present at the web services client;
    providing at least one uniform link in the consolidation toolbar for at least one common activity corresponding to the one or more billers, wherein providing the at least one uniform link comprises associating Uniform Resource Locators (URLs) of the one or more biller corresponding to the at least one common activity with the at least one uniform link and updating the at least one uniform link each time the browser is launched; and
    providing an automated reminder in the consolidation toolbar for the at least one bill payment related activity for at least one of the one or more billers
    the list of billers being derived from one or more billers stored in the central repository present in the network, the list of billers being associated with the authenticated user, wherein each of the one or more billers is a service provider seeking a payment for one or more services provided to the authenticated user;
  e. presenting the consolidated list of billers, the at least one uniform link, and the automated reminder to the authenticated user, wherein each biller of the consolidated list of the billers, the at least one uniform link, and the automated reminder are displayed as corresponding graphical images in the consolidation toolbar;
  f. performing an action on the consolidation toolbar, the action being one of a selection of at least one biller from the list of consolidated billers, accessing the at least one uniform link, and accessing the automated reminder, the action being performed by the authenticated user;
  g. displaying to the user, the displaying comprising:
    displaying a user authentication page of the at least one selected biller when the action comprises selection of at least one biller from the list of consolidated billers, wherein the corresponding user authentication page is displayed directly in response to the selection of the at least one biller;
    displaying a page corresponding to the at least one uniform link when the action comprises accessing the at least one uniform link; and
    displaying the details of the automated reminder to the user when the action comprises accessing the automated reminder;
  h. providing authentication information for authenticating the user at the authentication page when the authentication page is displayed, the authentication being based on the specific authentication information corresponding to the at least one selected biller, wherein the specific authentication information is transferred from the password vault and electronic wallet to the authentication page without any intervention of the user;
  i. performing the at least one bill payment related activity on a website of the at least one selected biller; and
  j. saving one or more details associated with the at least one bill payment related activity at the central repository corresponding to profile of the user.

6. The method of claim 1, wherein the profile information is at least one of: a method of payment, the authentication information, a list of consolidated billers for each of the one or more users, and at least one automated reminder.

7. The method according to claim 1, wherein the one or more details associated with the at least one bill payment related activity is at least one of: a type of the detail associated with a payment, a description of the payment, due date of the payment, amount due of the payment, minimum amount due of the payment, account information related to the payment, wherein the payment being the at least one bill payment related activity.

8. The method according to claim 1 further comprising creating an automated reminder associated with the at least one bill payment related activity corresponding to the at least one biller, wherein the automated reminder is saved at the central repository.

* * * * *